United States Patent [19]

Mann et al.

[11] Patent Number: 4,720,073
[45] Date of Patent: Jan. 19, 1988

[54] SEAT LONGITUDINAL ADJUSTING MECHANISM

[75] Inventors: Bernd Mann, Pfarrweisach/OT Römmelsdorf; Emil Dinkel, Coburg; Hans Rampel, Ahorn/OT Schorkendorf, all of Fed. Rep. of Germany

[73] Assignee: Brose Fahrzeugteile GmbH & Co. KG., Coburg, Fed. Rep. of Germany

[21] Appl. No.: 758,401

[22] Filed: Jul. 24, 1985

[30] Foreign Application Priority Data

Jul. 25, 1984 [DE] Fed. Rep. of Germany ....... 3427467

[51] Int. Cl.$^4$ ............................................. F16M 13/00
[52] U.S. Cl. ...................................... 248/430; 248/419
[58] Field of Search ............... 248/430, 429, 424, 420, 248/419; 312/331; 384/19, 55, 58

[56] References Cited

U.S. PATENT DOCUMENTS

| 3,022,975 | 2/1962 | Horton | 248/420 |
| 3,137,472 | 6/1964 | Louton | 248/420 |
| 3,430,516 | 3/1969 | Pickles | 248/420 |
| 4,355,778 | 10/1982 | Hess | 248/430 |

FOREIGN PATENT DOCUMENTS 3321869 6/1983 Fed. Rep. of Germany .

Primary Examiner—Reinaldo P. Machado
Assistant Examiner—A. Chin-Shue
Attorney, Agent, or Firm—Barnes & Thornburg

[57] ABSTRACT

A seat longitudinal adjusting mechanism for a motor vehicle seat with a guide rail unit consisting of two rails enclosing therebetween a hollow space and longitudinally displaceably supported at one another. A toothed rack connected with one rail extends within the hollow space, into which engages a pinion supported in a pinion cassette. The pinion is driven by an adjusting gear. For facilitating the assembly, a preassembly rail extending in the rail longitudinal direction is provided which includes fastening means for fastening the pinion cassette at the preassembly rail, independently of the rails, whereby the length of the preassembly rail is essentially equal to the distance of the pinion cassette from one end of the other rail. The preassembly rail preassembled together with the pinion cassette can then be inserted correspondingly into the other rail.

31 Claims, 6 Drawing Figures

SEAT LONGITUDINAL ADJUSTING MECHANISM

The present invention relates to a seat longitudinal adjusting mechanism, especially for a motor vehicle seat, with two rails which are supported longitudinally displaceable adjacent one another, enclose therebetween a hollow space and are connected with a respective seat part, with a toothed rack connected with one of the rails as well as with a pinion engaging in the toothed rack which is supported in a pinion bearing, possibly in a pinion cassette attached to the other rail and which is adapted to be driven by an adjusting gear provided at the other rail. The two rails form a mechanically stable compact, possibly box-shaped guide rail unit which completely surrounds the pinion bearing, possibly the pinion cassette and, in this manner, protects the same against external impacts and safeguards the same against dirt. The toothed rack is correspondingly more or less completely covered, dependent on the mutual position of the two rails. The fastening of the pinion bearing, respectively, of the pinion cassette (pinion bearing in addition to a bow-shaped member surrounding the toothed rack) requires an increased expenditure by reason of the amount of space inside of the other rail.

The task of the present invention resides in facilitating the assembly of the guide rail unit, especially the assembly of the pinion bearing, respectively of the pinion cassette.

The underlying problems are solved according to the present invention by a preassembly rail extending in the rail longitudinal direction and adapted to be inserted into the hollow space, which is provided with fastening means for fastening the pinion bearing, respectively, the pinion cassette at the preassembly rail independently of the other rail and whose length is at least equal to the distance of the pinion bearing, respectively, of the pinion cassette from one of the ends of the other rail. The pinion bearing, respectively, the pinion cassette can therefore be assembled on the preassembly rail outside the other rail without spatial problems, possibly also at a different point in time and at a different location. For purposes of installation of this preassembly unit into the other rail, the preassembly rail merely has to be inserted into the other rail from one end whereby the one rail may have been placed, though not necessarily has to be placed over the other rail, already prior thereto.

The two rails of the guide rail unit are frequently made of light metal rails for cost reasons and for saving in weight, optimally of extruded light metal rails. Fastening problems result therefrom because threads cut into such a rails do not exhibit a sufficient strength. According to a further feature of the present invention, it is therefore proposed that the preassembly rail be provided with fastening means for fastening the adjusting gear and/or the seat part coordinated to the other rail at the preassembly rail inserted into the hollow space by means of a fastening element which, extending through a corresponding opening of the wall of the other rail, cooperates with the fastening means of the preassembly rail. The adjusting gear, respectively, seat part secured in this manner at the rail therefore engages at the preassembly rail whereby the other rail is clamped-in between the preassembly rail and the respectively secured part and is therefore mechanically loaded and stressed only over a large area.

Threaded elements are preferably used as fastening means, optimally threaded nuts secured at the preassembly rail. The nuts may be welded to the preassembly rail or may be pressed-on at the preassembly rail.

The preassembly rail exhibits a particularly large mechanical stability with low weight of its own if the preassembly rail is formed by a profile rail, preferably by a U-profile rail.

In order to keep small the specific load or stress per unit area of the one rail, it is proposed according to the present invention that the profile rail abuts areally at the inside of the other rail at least over a large portion of its profile rail length with the profile outside thereof.

In an alternative embodiment of the present invention which is characterized by particularly low manufacturing costs, the preassembly rail is constructed as flat plate which is supported preferably with one of its plate sides either directly or at least by way of a part of the fastening means at an inner surface of the other rail.

The preassembly rail is preferably made of steel in order to achieve the desired high strength. In lieu of separate threaded nuts, the steel rail may also be provided with screw-in threads cut into the rail.

The preassembly rail may serve as reinforcement of the one rail over the entire length thereof if the length of the preassembly rail corresponds essentially to the length of the other rail.

The two rails of the guide rail unit are supported at one another in a prior construction by way of two longitudinal ball bearings which are provided in relation to the hollow space cross section at essentially mutually opposite places of the hollow space cross section. One of the two longitudinal bearings is located within the lower area of the cross section and serves for the absorption of vertical bearing forces. The other longitudinal bearing, which is located in the upper area of the cross section, serves primarily for the absorption of transverse forces. With a load on the guide rail unit, the upper longitudinal bearing must absorb not only transverse forces but also a part of the vertical forces because the lower longitudinal bearing does not lie generally underneath the point of force engagement. This may lead to an overload of this bearing. Consequently, a further independent basic concept of the present invention resides in relieving the upper longitudinal bearing. For that purpose, a second longitudinal bearing is provided within the lower area of the hollow space cross section. This further longitudinal bearing serves for the absorption of the vertical forces which have not been absorbed in the lower area by the other longitudinal bearing. The upper longitudinal bearing is therefore relieved of these vertical forces and therefore only still has to absorb tilting moments about a tilting axis parallel to the rail longitudinal direction.

In a mechanically particularly stable construction of the present invention, provision is made that the first of the two rails is constructed essentially U-shaped in cross section with downwardly extending lateral legs of the U-shape, that the lateral leg edges are each supported at the second rail by way of a longitudinal movement bearing and that a further longitudinal movement bearing is formed within the area of the upper end of one of the lateral legs.

Provision may thereby be made that the bearing surface is formed at a bearing projection extending outwardly from the lateral leg within the area of the upper end of the lateral leg.

A compact, optically pleasing form of the guide rail unit which is closed off against the outside, is obtained in that the second rail is constructed essentially L-shaped in cross section with inwardly angularly bent rail edges, and in that one longitudinal movement bearing each is provided within the area of the rail edges and the third longitudinal movement bearing is arranged within the angular area of the L-shape.

In lieu of the customary roller bearings, the longitudinal movement bearings may be constructed according to the present invention also as slide bearing. A slide insert assures for a low-friction and low-wear operation which carries at least one of the mutually abutting slide surfaces of the slide bearing. The rails may then also be constructed of extruded profiles which can be made with practically any desired cross-sectional shape at low cost. If the extruded metal rails were to abut directly at one another, then increased wear and increased friction would result.

The slide insert may be formed by a plastic strip or by a sheet-metal member coated with plastic material. The coefficient of friction between the correspondingly selected plastic material and the oppositely disposed rail can be selected so as to be low.

The slide insert, however, may also be constructed as a sheet metal strip provided with grease pockets because the grease pockets assure a sufficient lubrication during a relatively long period of operation.

In a preferred embodiment of the present invention, provision is made that the two rails which are essentially L-shaped in cross section, are supported at one another by way of two slide bearings which are each arranged within the area of two longitudinal edges of the two rails, and in that each slide bearing includes a bearing support part formed at one of the two rails, preferably however, in each case at the lower rail, which in the rail cross section essentially form-lockingly surrounds a bearing core part formed at the other rail. Consequently, ony two slide bearings are required with high mechanical stability. In particular, the form-locking connection assures that tilting moments occurring during operation do not lead to a falling apart or disassembly of the one or the other slide bearing.

It is proposed for that purpose in accordance with the present invention that the bearing core part of the upper slide bearing which is formed at the upper rail, is formed by a thickened portion of the longitudinal edge of the upper essentially horizontal leg of the L-shape of the upper rail, and in that the bearing core part of the lower slide bearing which is formed at the upper rail, is formed by an essentially horizontal, outwardly angularly bent edge strip at the essentially vertical leg of the L-shape of the upper rail as well as by a thickened edge portion of the edge strip, and in that the edge strip abuts areally at the essentially horizontal leg of the L-shape of the lower rail. The normally desired rectangular hollow space cross section is assured with lowest possible material use by reason of the L-rail profile. The predominant vertical forces are transmitted without any problems principally from the edge strip to the (plane) horizontal leg of the lower rail. The arrangement of the slide insert at the bearing support part offers in particular the advantage that a mechanical refinforcement of the bearing support part takes place thereby.

These and other objects, features and advantages of the present invention will become more apparent from the following description when taken in connection with the accompanying drawing which shows, for purposes of illustration only, several embodiments in accordance with the present invention, and wherein.

Figure 1:
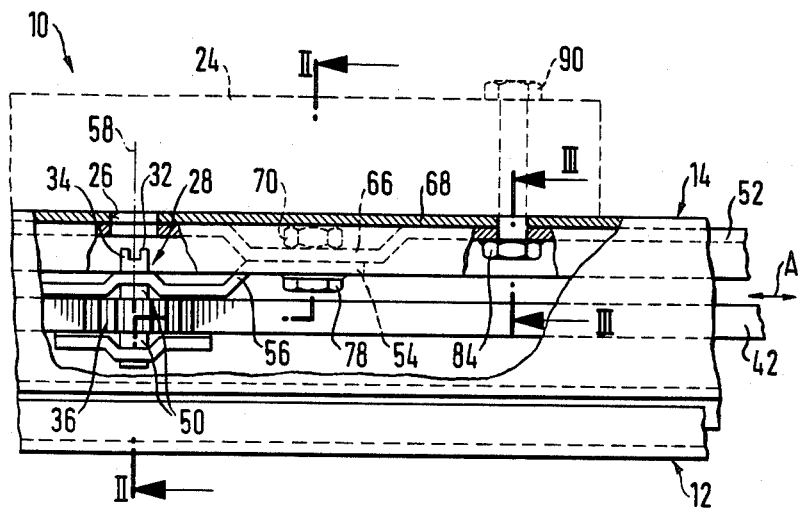
FIG. 1 is a partial elevational view, partly broken away, of a guide rail unit in accordance with the present invention.
Figure 2:
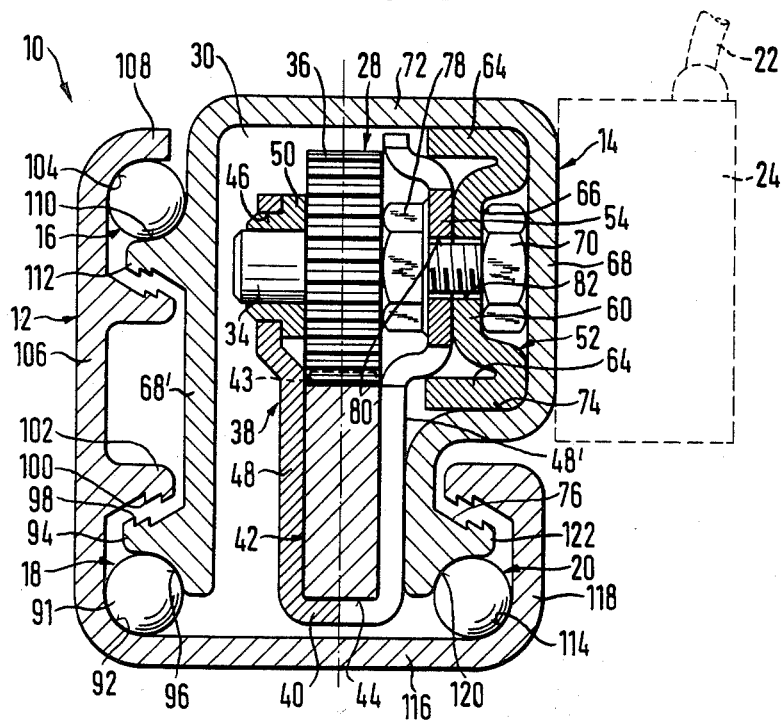
FIG. 2 is a cross-sectional view, taken along line II—II of FIG. 1.

Referring now to the drawing wherein like reference numerals are used throughout the various views to designate like parts, the cassette-like guide rail unit generally designated by reference numeral 10 which is illustrated in FIGS. 1 and 2 partly in cross section, forms part of a seat longitudinal adjusting mechanism for a motor vehicle seat. This longitudinal seat adjusting mechanism may be combined with a tilting and height-adjusting mechanism of conventional construction and therefore not illustrated herein. The guide rail unit 10 is formed by two rails generally designated by reference numerals 12 and 14, whereby the lower rail 12 is connected in a conventional manner (not illustrated) with a lower seat part and the upper rail 14 with an upper seat part, possibly by interconnection of the tilting and height-adjusting mechanisms between one of the two rails and the corresponding seat part. For example, one or more fastening angles for fastening the seat at the body floor may be used as lower seat part and a seat frame as upper seat part.

The upper rail 14 is supported at the lower rail 12 movable in the rail longitudinal direction A (double arrow in FIG. 1), and more particularly, by way of three longitudinal movement bearings generally designated by reference numerals 16, 18 and 20 to be described more fully hereinafter.

Such a longitudinal movement of one rail with respect to the other rail which has as a consequence a corresponding longitudinal movement of the attached vehicle seat, is carried out with the aid of a non-illustrated motor (electric motor, pneumatic motor, or the like), which is operatively connected by way of a flexible drive shaft 22, indicated in dash lines in FIG. 2, with an adjusting gear 24 attached at the upper rail 14. The adjusting gear 24 has a conventional construction and is constructed, for example, as a single or multi-stage speed reduction gear. On the output side, the adjusting gear 24 is operatively connected with a pinion 28 located in the hollow space 30 of the guide rail unit 10 by way of a drive shaft (not shown) extending through an opening 26 (FIG. 1) of the rail 14. The drive shaft may thereby be connected with the drive pinion 28 by way of a plug-in coupling. An end 32 of a pinion shaft 34 constructed correspondingly as coupling end, can be recognized in FIG. 1. The pinion shaft 34 is rotatably supported on both sides of the pinion gear 36 within a pinion cassette generally desginated by reference numeral 38.

The pinion cassette 38 consists of an essentially U-shaped member 40 which surrounds a toothed rack 42 extending in the rail longitudinal direction at the toothed rack backside 44 disposed opposite the row of teeth 43 thereof. Within the area of the free ends of the two side legs 48 and 48' of the U-shape, bearing sleeves 50 are inserted in corresponding apertures 46 of the side legs 48, 48', in which the pinion shaft 34, in turn, is rotatably supported. The pinion gear 36 is located between two bearing sleeves 50 and engages with the row of teeth 43 of the toothed rack 42. The pinion cassette 38 assures reliably that the toothed rack 42 and the pinion 28 remain in mutual engagement also when strong forces seek to displace one rail relative to the other in the direction A. Such forces occur, for example, in case of an accident. It should be mentioned additionally that the toothed rack 42 is operatively connected either directly with the lower rail 12 or with the corresponding seat part.

A preassembly rail generally designated by reference numeral 52 is inserted into the upper rail 14 in the direction A from one rail end thereof, whereby the pinion cassette 38 has been attached prior thereto to the preassembly rail 52. For that purpose, the pinion cassette 38 is provided with two fastening lugs 54 which project on both sides of the right side leg 48', as viewed in FIG. 2, in the direction A within the upper area of the side leg. By reason of the double-cranking 56 between a respective lug 54 and the side leg 48', the two fastening lugs 54 are displaced or shifted away from the pinion 38 in a direction parallel to the pinion axis 58 (FIG. 1) so as to approach the center leg 60 of the preassembly rail 52 which is U-shaped in cross section. According to FIG. 3, the center leg 60 is arranged in a vertical plane, i.e., perpendicularly to the pinion axis 58; the side legs 64 of the U-shape which are therefore parallel to the axis 58 point in FIGS. 2 and 3 toward the left, i.e., toward the pinion 38. The center leg 60 is provided within the area of the fastening lug 54 with an indentation 66 pointing toward the fastening lug in order to create a mounting space for a fastening nut 70 between the indentation 66 and a vertical side leg 68 of the rail 14. As to the rest, the center leg 60 of the preassembly rail 52 abuts areally at this side leg 68 of the rail 14 (see also FIG. 1). In a similar manner, also the upper side leg 64 of the preassembly rail 52 abuts areally at a center leg 72 of the rail 14 adjoining the side leg 68 of the rail 14 which has an essentially U-shape with a U-opening open in the downward direction. The lower side leg 64 of the preassembly rail 52 abuts areally at a flank 74 of an approximately Z-shaped stepped offset 76 of the side leg 68 of the rail 14, which is parallel to the pinion axis 58.

The fastening lug 54 may be rigidly connected with the preassembly rail 52 within the area of the indentation 66, for example, with the aid of a threaded connection, for which purpose a corresponding bolt 78 is to be extended through an aperture 80 of the fastening lug 54 as well as through an aperture 82 aligned therewith of the preassembly rail 52 within the area of the fastening nut and is to be screwed into the fastening nut 70. The fastening nut may, but does not have to be, rigidly connected beforehand with the preassembly rail 52, for example, by spot-welding or pressing-in.

Figure 3:
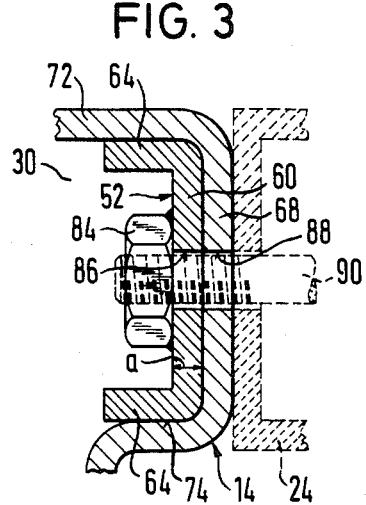
FIG. 3 is a partial cross-sectional view, taken along line III—III of FIG. 1.

For purposes of connecting the adjusting gear 24 or also the seat part coordinated to the rail 14 (not shown) with the rail 14, the preassembly rail 52 is provided according to FIGS. 1 and 3, on the side of the center leg 60, which faces the interior space 30 of the guide rail unit, with fastening nuts 84 rigidly attached at the center leg 60, which extends in this area continuously plane, as well as with corresponding through-openings 86 in the center leg 60 aligned with the threaded bore. With an inserted preassembly rail 52, corresponding through-openings 88 in the side leg 68 of the rail 14 are aligned with these openings 86. The adjusting gear, respectively, the corresponding seat part may therefore be attached at the preassembly rail 52 with the aid of corresponding threaded bolts (threaded bolts 90 indicated in dash line in FIGS. 1 and 3), whereby the guide rail 14 is clamped-in between the preassembly rail 52 and the corresponding part. In this manner, also the preassembly rail 52 is rigidly connected with the rail 14. In case of need, also the rail 14 may be secured at the preassembly rail 52 by means of a corresponding bolt, whereby the bolt head then abuts at the side of the rail 14 and the bolt shank is screwed into one of the fastening nuts 84. In all cases, a local mechanical overload of the rail 14 formed of an extruded light metal profile is provided. The preassembly rail which is made best of steel, transmits the forces acting on the same over a large area, namely, over practically the entire outside of the U-profile shape, onto the rail 14, With the use of the illustrated fastening nuts, the material thickness a of the preassembly rail 52 may be selected correspondingly small for purposes of savings in weight and material. With a greater material thickness, a corresponding screw-in thread may be cut directly into the preassembly rail.

During the assembly of the guide rail unit, at first the pinion cassette 38 is assembled at the preassembly rail 52 in the manner described above. This preassembly unit may then be inserted into the rail 14 possibly at a different location and at a different point in time, whereby the toothed rack 42 has been appropriately inserted beforehand into the pinion cassette 38. The rail 14 may be already assembled in this case with the rail 12; however, it is also possible to first insert the preassembly rail 52 into the rail 14 and subsequently the rail 14 into the rail 12. Finally, the preassembly rail 52 is threadably connected with the adjusting gear 24 and possibly with the corresponding seat part and the toothed rack 42 is secured at the rail 12, respectively, at the corresponding seat part.

Figure 4:
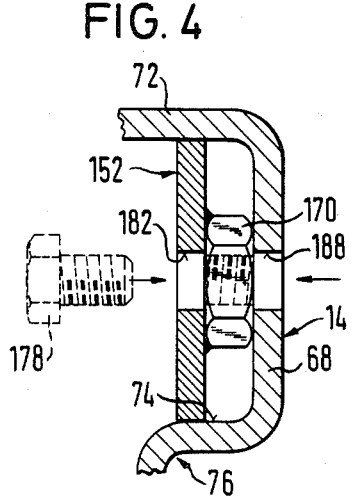
FIG. 4 is a cross-sectional view, similar to FIG. 3, of a modified embodiment in accordance with the present invention.

An alternative embodiment of the preassembly rail is illustrated in FIG. 4 and generally designated therein by reference numeral 152. The preassembly rail 152 now consists of a flat plate perpendicular to the pinion axis 58 which is fitted-in between the center leg 72 and the stepped flank 74 of the stepped section 76 of the side leg 68 of the rail 14. Fastening nuts 170 are again rigidly attached at this preassembly rail 152, for example, all of the fastening nuts on the preassembly rail side facing the side leg 68 of the rail 14. The threaded bore is aligned with a through-opening 182 of the preassembly rail 152 and possibly also with a through-opening 188 of the rail 14. A fastening bolt 178 indicated in FIG. 4 in dash line can therefore be selectively screwed-in into the fastening nut 170 from the left side in FIG. 4 for fastening the pinion cassette at the rail 14 or from the right side for fastening the adjusting gear, respectively, the corresponding seat part at the rail 14. In the latter case, the fastening nuts 170 are supported with a sufficiently large abutment surface at the leg 68 of the rail 14. It can be seen that also in the embodiment according to FIG. 4, the pinion cassette together with the toothed rack can be preassembled at the preassembly rail 152.

As already mentioned, the rail 14 which is essentially U-shaped in cross section, is supported at the lower rail 12 which is essentially L-shaped in cross section, by way of three longitudinal movement bearings 16, 18 and 20. The longitudinal movement bearing 18 therefore is formed in the angular area of the L-shape; the bearing balls 91 of the longitudinal movement bearing 18 roll off in the corresponding cylindrically curved angular area 92. The left side leg 68' of the U-shape of the rail 14, as viewed in FIG. 2, is provided at its lower edge with a thickened portion 94 which is again provided with a corresponding cylindrically curved, downwardly and leftward pointing abutment surface 96 for the bearing balls 91. At its top side, the thickened portion 94 is provided with retention teeth 98 which are disposed opposite to and at a distance from corresponding retention teeth 100 of an inwardly projecting extension 102 of the rail 12. In all the other longitudinal movement bearings 16 and 20, similar mutually oppositely disposed teeth are provided which engage in one another when in case of a load, the mutually coordinated bearing surfaces seek to distance themselves excessively from one another. A pronounced spreading-apart within this area is then prevented by the mutually engaging teeth.

The longitudinal movement bearing 16 lies above the longitudinal movement bearing 18 on the same side of the 12 is formed by the angular area between the vertical leg 106 and the inwardly angularly bent edge 108 thereof. The bearing surface 104 is therefore directed in FIG. 2 toward the right and downwardly. A bearing surface 110 within the angular area between the side leg 68' of the rail 12 and a bearing projection 112 laterally projecting from the side leg 68' is disposed opposite the bearing surface 104.

The longitudinal movement bearing 20 is disposed diagonally opposite the longitudinal movement bearing 16. The bearing surface 114 at the rail 12 is formed, similar to the bearing surface 104, by the angular area between the horizontal leg 116 of the L-shape of the rail 12 and an upwardly angularly bent leg edge 118. It is directed in FIG. 2 toward the left and upwardly. A bearing surface 120 on a thickened portion 122 at the lower edge of the side leg 68 of the U-shape of the rail 14 is disposed opposite the bearing surface 114.

The two lower longitudinal movement bearings 18 and 19 therefore absorb the occurring vertical forces. The upper longitudinal movement bearing 16 serves for the absorption of the tilting moments about the tilting axis parallel to the longitudinal direction A of the rails in both directions.

Figure 5:
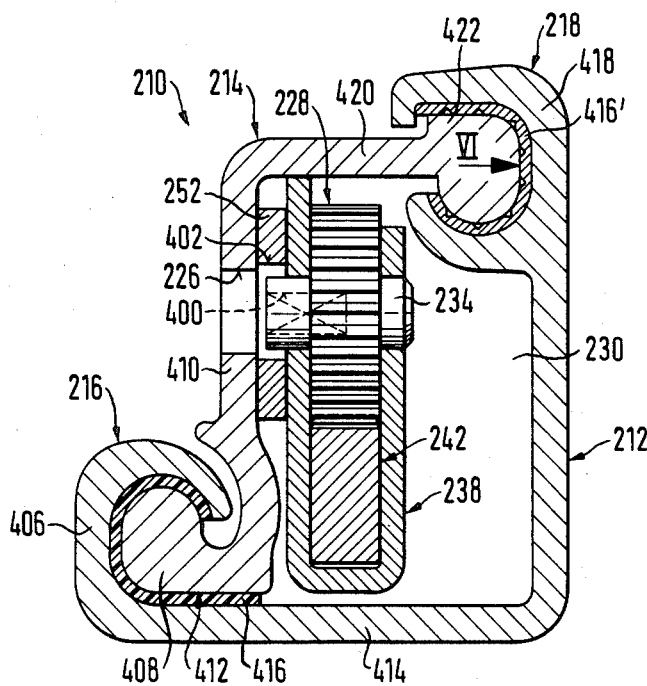
FIG. 5 is a cross-sectional view, similar to FIG. 2, through a modified embodiment in accordance with the present invention.

In the further embodiment illustrated in FIG. 5, structural elements which correspond in their function to those of the embodiment according to FIGS. 1 and 2, are designated by the same reference numerals of the 200 series.

The guide rail unit therefore generally designated by reference numeral 210 is formed by the lower rail 212 and the upper rail 214. Both rails 212 and 214 have an essentially L-profile shape. The profile corners are disposed diagonally opposite one another so that a hollow space 230 approximately rectangular in cross section and enclosed by both rails results therefrom. The two rails 212 and 214 are movably supported at one another within the area of their lower longitudinal edges in the rail longitudinal direction by way of one longitudinal movement bearing generally designated by reference numerals 216 and 218, respectively. These bearings are formed in the embodiment to be described hereinafter by slide bearings.

FIG. 5 is a cross section through the guide rail unit 210 within the area of the pinion cassette 238, in which the pinion 228 is rotatably supported. The pinion 228 engages in the toothed rack 242 which is secured in a conventional manner (not shown) at the lower rail 212 or at the body supporting the lower rail 212. The pinion cassette 238 is secured at the upper rail 214 either directly or as illustrated by way of the preassembly rail 252 corresponding to the preassembly rail 52, 152 in FIGS. 1 to 3. With respect to further details, reference is made to the embodiments in FIGS. 1 to 4.

For coupling the pinion 228 with a drive shaft of an adjusting gear (not shown), the pinion shaft 234 is provided, for example, with an internal polygon for the reception of a corresponding external polygon of the drive shaft. The drive shaft can be inserted through an opening 226 of the upper rail 214 as well as through an adjoining opening 402 of the preassembly rail 252.

Figure 6:
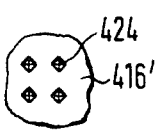
FIG. 6 is a detail elevational view in the direction of arrow VI in FIG. 5.

The longitudinal bearing 216 which is illustrated in FIG. 5 in the lower left corner, is formed by a bearing support part 406 formed at the lower rail 212, which form-lockingly surrounds a bearing core part formed at the upper rail 214 in the form of a thickened edge portion 408. The thickened edge portion 408 is formed on an edge strip 412 projecting angularly outwardly at right angle from the vertical leg 410 of the upper rail 214. With its lower side, the edge strip 412 abuts over a large area on the horizontal leg 414 of the L profile-shaped lower rail 212, however, under interposition of a slide insert 416 for reducing the mutual friction. The slide insert 416 may consist of plastic material, of a steel plate coated with plastic material or of a steel plate provided with grease pockets, as is illustrated in the example of the corresponding slide insert 416' inserted into the right upper longitudinal bearing 218. This slide insert 416' is, like the slide insert 416, inserted into the interior curvature of a bearing support part 418 which is formed on the lower rail 212 and is approximately C-shaped in cross section. The bearing support part 418 surrounds a thickened edge portion 422 formed at the upper horizontal leg 420 of the upper rail 214, whereby the inside of the slide bearing insert 416' which abuts at the thickened edge portion 422, is provided with the grease pockets 424, specially illustrated in FIG. 6, for example, in the form of pressed-in pyramids. The lubricant placed into these grease pockets forms a lubricant supply or reservoir which assures a continuous lubricant re-supply, i.e. also after longer operating periods.

Since the two thickened portions 408 and 422 are surrounded in each case approximately C-shaped by corresponding bearing support parts 406 and 418, the mutually coordinated slide bearing parts cannot separate from one another in any direction disposed transversely to the rail longitudinal direction in case of corresponding tensional forces, respectively tilting moments. Tilting moments about a tilting axis parallel to the rail longitudinal direction which act between the two rails 212 and 214, are therefore transmitted on without problems. The relatively large, mutual abutments surface which is horizontal in cross section, within the area of the edge strip 412 assures a problem-free transmission of the vertical seat forces into the lower rail 212 and from the latter into the body floor plate. The guide rail unit 10 can be manufactured mechanically stable, compact and at low cost. The pinion cassette can be assembled rapidly and simply. The danger of soiling of the toothed rack and of the pinion does not exist; by the same token, the danger also does not exist that the toothed rack provided with lubricant dirties other objects, such as clothing objects.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A seat longitudinal adjusting mechanism, especially for a motor vehicle seat, comprising two rail means longitudinally displaceably supported at one another and profiled correspondingly to form therebetween a hollow space, the two rail means being adapted to be connected with a corresponding seat part, a toothed rack means operatively connected with one of the two rails, said toothed rack means extending within the hollow space in the rail longitudinal direction and being substantially completely covered by the rail means transversely to the longitudinal rail direction, a pinion within the hollow space engaging in the toothed rack means, said pinion being supported in pinion bearing means, adjusting gear means located on a side of the other rail means facing away from the hollow space and detatchably connected through a hole in said other rail means with said pinion for driving said pinion, and preassembly rail means adapted to be inserted into the hollow space of the rail means from one of the rail ends, said preassembly rail means including fastening means for fastening the pinion bearing means at the preassembly rail means prior to insertion of the preassembly rail means, the length of the preassembly rail means corresponding at least to the distance of the pinion bearing means from the one end of the other rail means.

2. A seat longitudinal adjusting mechanism according to claim 1, wherein the pinion bearing means includes a pinion cassette means.

3. A seat longitudinal adjusting mechanism according to claim 1, wherein the preassembly rail means is made of steel.

4. A seat longitudinal adjusting mechanism according to claim 1, wherein the length of the preassembly rail means essentially corresponds to the length of the other rail means.

5. A seat longitudinal adjusting mechanism according to claim 1, wherein the two rail means are supported by way of at least one longitudinal bearing means, the longitudinal movement bearing means being constructed as slide bearing means.

6. A seat longitudinal adjusting mechanism according to claim 1, wherein the two rail means are essentially half-shell-shaped and support one another along their longitudinal edges.

7. A seat longitudinal adjusting mechanism according to claim 1, wherein said preassembly rail means is provided with at least one fastening means for securely fastening at least one of the adjusting gear means and the seat part coordinated to the other rail means, at the other rail means by a fastening element which extends through a corresponding opening of the wall of the other rail means, when said preassembly means has been inserted into the other rail means.

8. A seat longitudinal adjusting mechanism according to claim 7, wherein the fastening means is formed by a threaded element.

9. A seat longitudinal adjusting mechanism according to claim 7, wherein the fastening means is formed by a nut rigidly secured at the preassembly rail means.

10. A seat longitudinal adjusting mechanism according to claim 1, wherein the preassembly rail means is formed by a profile rail.

11. A seat longitudinal adjusting mechanism according to claim 10, wherein the profile rail abuts at least over a large portion of its profile length with its profile outside at the inside of the other rail means.

12. A seat longitudinal adjusting mechanism according to claim 10, wherein said profile rail is a U-shaped profile rail.

13. A seat longitudinal adjusting mechanism according to claim 12, wherein the two rail means are supported by way of two longitudinal movement bearing means disposed essentially diagonally opposite one another in relation to the hollow space cross section, at least one of the two longitudinal movement bearing means being constructed as slide bearing means.

14. A seat longitudinal adjusting mechanism according to claim 13, wherein at least one of the mutually abutting slide surfaces of the slide bearing means are formed as a slide bearing insert attached at the corresponding rail means.

15. A seat longitudinal adjusting mechanism according to claim 14, wherein said last-mentioned rail means is an extruded rail.

16. A seat longitudinal adjusting mechanism according to claim 14, wherein the slide bearing insert is formed by a plastic strip or by a sheet metal strip coated with a plastic material.

17. A seat longitudinal adjusting mechanism according to claim 14, wherein the slide bearing insert is formed by a sheet metal strip provided with grease pockets.

18. A seat longitudinal adjusting mechanism according to claim 13, wherein the two rail means which are essentially L-shaped in cross section, are mutually supported by way of two slide bearing means which are arranged within the area of two longitudinal edges of the rail means, and wherein each slide bearing means includes a bearing support part formed at one of the two rail means, which essentially lockingly surrounds a bearing core part formed at the other rail means, as viewed in the rail cross section.

19. A seat longitudinal adjusting mechanism according to claim 18, wherein said one rail means is a lower rail.

20. A seat longitudinal adjusting mechanism according to claim 19, wherein a bearing core part, of an upper slide bearing means which is formed at an upper rail means, of the upper slide bearing means is formed by a thickened portion of a longitudinal edge of an upper essentially horizontal leg of the L-shape of the upper rail means, and wherein the bearing core part of the lower slide bearing means, which is formed at the upper rail means, is formed by an essentially horizontal outwardly angularly bent edge strip at an essentially vertical leg of the L-shape of the upper rail means as well as by a thickened edge portion of the edge strip, and in that the edge strip abuts at the essentially horizontal leg of the L-shape of the lower rail means.

21. A seat longitudinal adjusting mechanism according to claim 18, wherein the bearing support part is provided with a slide bearing insert.

22. A seat longitudinal adjusting mechanism according to claim 21, wherein the slide bearing insert is formed by a plastic strip or by a sheet metal strip coated with a plastic material.

23. A seat longitudinal adjusting mechanism according to claim 21, wherein the slide bearing insert is formed by a sheet metal strip provided with grease pockets.

24. A seat longitudinal adjusting mechanism according to claim 1, wherein the preassembly rail means is constructed as a flat plate which is supported at an inner surface of the other rail means.

25. A seat longitudinal adjusting mechanism according to claim 24, wherein the flat plate is supported with one of its plate sides either directly or at least by way of a portion of the fastening means at the inner surface of the other rail means.

26. A seat longitudinal adjusting mechanism according to claim 1, in which the two rail means are mutually supported by way of a first longitudinal movement bearing means arranged in the lower area of the hollow space cross section and a second longitudinal movement bearing means diagonally oppositely disposed to said first longitudinal movement bearing with respect to the hollow cross section, and a third longitudinal movement bearing means in the lower area of the hollow space cross section.

27. A seat longitudinal adjusting mechanism according to claim 26, wherein a first one of the two rail means is constructed essentially U-shaped in cross section with downwardly extending side legs of the U-shape, the side leg edge portions being supported at the second rail means by way of one of the longitudinal movement bearing means, and a further one of the longitudinal movement bearing means being formed within the area of the upper end of one of the two side legs.

28. A seat longitudinal adjusting mechanism according to claim 27, wherein a bearing surface of the further longitudinal movement bearing means is formed within the area of the upper end of the side leg at a bearing projection projecting outwardly from the side leg.

29. A seat longitudinal adjusting mechanism according to claim 28, wherein the second rail means is constructed essentially L-shaped in cross section with inwardly angularly bent rail edge portions, and wherein one longitudinal movement bearing means each is formed within the area of the rail edge portions and one longitudinal movement bearing means is formed within the angular area of the L-shape.

30. A seat longitudinal adjusting mechanism according to claim 1, wherein the length of the toothed rack means corresponds essentially to that of the one rail means.

31. A seat longitudinal adjusting mechanism according to claim 30, wherein the length of the one rail means essentially corresponds to the length of the other rail means.

* * * * *